(12) United States Patent
Qu

(10) Patent No.: US 11,474,689 B2
(45) Date of Patent: Oct. 18, 2022

(54) METHOD AND APPARATUS FOR OBTAINING CONTENT

(71) Applicant: BEIJING DAJIA INTERNET INFORMATION TECHNOLOGY CO., LTD., Beijing (CN)

(72) Inventor: Meikai Qu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 9 days.

(21) Appl. No.: 17/136,667

(22) Filed: Dec. 29, 2020

(65) Prior Publication Data
US 2021/0311622 A1 Oct. 7, 2021

(30) Foreign Application Priority Data

Apr. 2, 2020 (CN) .......................... 202010254542.7

(51) Int. Cl.
*G06F 3/0488* (2022.01)
*G06F 3/04883* (2022.01)

(52) U.S. Cl.
CPC ................ *G06F 3/04883* (2013.01)

(58) Field of Classification Search
CPC ............ G06F 3/04883; G06F 3/0485
See application file for complete search history.

(56) References Cited

U.S. PATENT DOCUMENTS

| 8,971,572 | B1 * | 3/2015 | Yin ......................... G06T 7/73 345/173 |
| 9,851,896 | B2 * | 12/2017 | Jitkoff .................... G06F 3/017 |
| 9,880,726 | B2 * | 1/2018 | Briand ................ G06F 3/04883 |
| 10,019,146 | B2 * | 7/2018 | Clark .................... G06F 3/0483 |
| 10,585,577 | B2 * | 3/2020 | Takai .................... G06F 3/0482 |
| 10,606,461 | B1 * | 3/2020 | Eldawy ............... G06F 3/04847 |
| 10,642,365 | B2 * | 5/2020 | Huang ................... G06F 9/451 |
| 10,891,044 | B1 * | 1/2021 | Corsin ................ G06F 3/0485 |
| 2010/0235794 | A1 * | 9/2010 | Ording ................. G06F 3/0488 715/863 |
| 2010/0295781 | A1 * | 11/2010 | Alameh ................. G06F 3/017 345/158 |

(Continued)

FOREIGN PATENT DOCUMENTS

| CN | 103729124 A | 4/2014 |
| CN | 106933481 A | 7/2017 |

(Continued)

OTHER PUBLICATIONS

Chinese Office Action dated Jan. 25, 2021 for Application No. 202010254542.7, 17 pages.

(Continued)

*Primary Examiner* — Daeho D Song
(74) *Attorney, Agent, or Firm* — Frost Brown Todd LLC

(57) ABSTRACT

The disclosure relates to a method and an apparatus for obtaining content, and a non-transitory computer-readable storage medium. In response to detecting an end of a swiping on a page, the electronic device obtains a swiping speed of the swiping. The electronic device determines an object positioned by the swiping in the page based on the swiping speed and page parameters of the page, and obtains and displays content of the object.

16 Claims, 6 Drawing Sheets

(56) References Cited

U.S. PATENT DOCUMENTS

| | | | | |
|---|---|---|---|---|
| 2011/0074699 A1* | 3/2011 | Marr | G06F 3/04842 | 345/173 |
| 2012/0174005 A1* | 7/2012 | Deutsch | G06F 3/04817 | 715/764 |
| 2012/0218203 A1* | 8/2012 | Kanki | G06F 3/0488 | 345/173 |
| 2012/0218310 A1* | 8/2012 | Shinohara | G09G 5/34 | 345/670 |
| 2013/0111396 A1* | 5/2013 | Brid | G06F 3/04855 | 715/784 |
| 2013/0179830 A1* | 7/2013 | Lee | H04M 1/72469 | 715/784 |
| 2013/0207909 A1* | 8/2013 | Tanzawa | G06F 3/0485 | 345/173 |
| 2014/0176455 A1* | 6/2014 | Araki | G06F 3/0488 | 345/173 |
| 2014/0181730 A1* | 6/2014 | Briand | G06F 3/04883 | 715/784 |
| 2015/0058761 A1* | 2/2015 | Cai | G06F 3/04886 | 715/763 |
| 2016/0070429 A1* | 3/2016 | Clark | G06F 3/0482 | 715/784 |
| 2016/0124597 A1* | 5/2016 | Nagata | G06F 3/0488 | 345/173 |
| 2016/0179322 A1* | 6/2016 | Nagata | G06F 3/0485 | 715/784 |
| 2016/0357382 A1* | 12/2016 | Metz | G06F 3/04883 | |
| 2017/0099431 A1* | 4/2017 | Harada | H04N 5/232933 | |
| 2017/0285861 A1* | 10/2017 | Siddiq | G06F 3/0418 | |
| 2019/0324618 A1* | 10/2019 | Takimoto | G06F 3/04883 | |
| 2020/0058270 A1* | 2/2020 | Li | H04N 21/4312 | |
| 2020/0142554 A1* | 5/2020 | Lin | G06F 3/0482 | |
| 2021/0149534 A1* | 5/2021 | Song | G06T 13/80 | |

FOREIGN PATENT DOCUMENTS

| | | |
|---|---|---|
| CN | 107168628 A | 9/2017 |
| CN | 109086374 A | 12/2018 |
| CN | 109388317 A | 2/2019 |
| CN | 109669740 A | 4/2019 |
| CN | 110611829 A | 12/2019 |

OTHER PUBLICATIONS

Indian Office Action dated Jan. 3, 2022 for Application No. 202014057199, 6 pages.

\* cited by examiner

METHOD AND APPARATUS FOR OBTAINING CONTENT

This application is based on and claims priority to Chinese Patent Application No. 202010254542.7, filed on Apr. 2, 2020, the disclosure of which is herein incorporated by reference in its entirety.

TECHNICAL FIELD

The disclosure relates to a field of Internet technologies, and more particularly, to a method and an apparatus for obtaining content, an electronic device and a storage medium.

BACKGROUND

With rapid development of Internet technologies and wide spread of smart devices, a variety of social applications have been developed. These applications have become the first choice for more and more people to use the fragmented time for learning and entertainment. Users always want to see content they need more quickly in the process of using the applications.

SUMMARY

According to a first aspect of embodiment of the disclosure, a method for obtaining content is provided. The method includes:
obtaining a swiping speed of a swiping on a page in response to detecting an end of the swiping;
determining an object positioned by the swiping in the page based on the swiping speed and page parameters of the page; and
displaying content of the object.

According to a second aspect of embodiments of the disclosure, an apparatus for obtaining content is provided. The apparatus includes a processor and a memory. The memory is configured to store instructions executable by the processor. The processor is configured to execute the instructions stored in the memory, so as to:
obtain a swiping speed of a swiping on a page in response to detecting an end of the swiping;
determine an object positioned by the swiping in the page based on the swiping speed and page parameters of the page; and
display content of the object.

According to a third aspect of embodiments of the disclosure, an electronic device is provided. The electronic device includes:
a processor; and
a memory, configured to store instructions executable by the processor,
wherein the processor is configured to execute the instructions, so as to implement the method in any embodiment of the first aspect.

According to embodiments of a fourth aspect of the disclosure, a non-transitory computer-readable storage medium is provided. When instructions in the storage medium are executed by a processor of an electronic device, the electronic device is caused to implement the method in any embodiment of the first aspect.

It should be understood that the general description above and the detailed description below are only illustrative and explanatory and do not limit this disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure, and do not constitute an improper limitation of this disclosure.

DETAILED DESCRIPTION

In order to make the technical solution of the disclosure better understood by those skilled in the art, the technical solution in embodiments of the disclosure is described clearly and completely in conjunction with drawings in the following.

It should be noted that terms "first", "second", and the like in the specification and claims of the disclosure and in the above drawings are used to distinguish similar objects and need not be used to describe a particular order or sequence. It should be understood that the data used in this way is interchangeable where appropriate, so that embodiments of the disclosure described here can be implemented in an order other than those depicted or described here. The embodiments described in the following exemplary embodiments do not represent all embodiments consistent with this disclosure. Rather, they are only examples of devices and methods that are consistent with some aspects of this disclosure as detailed in the attached claims.

Take short video applications as an example. In the related art, short video content is usually obtained by preloading part of the content in a coarse-grained manner and then loading detailed content of the target short video in response to receiving a content obtaining instruction from the user for the target short video. Then, the short video content is sent to the client for the user to browse. This kind of loading may cause the client to wait for a certain time in the process of obtaining the page content, which leads to the problem of low efficiency.

Figure 1:
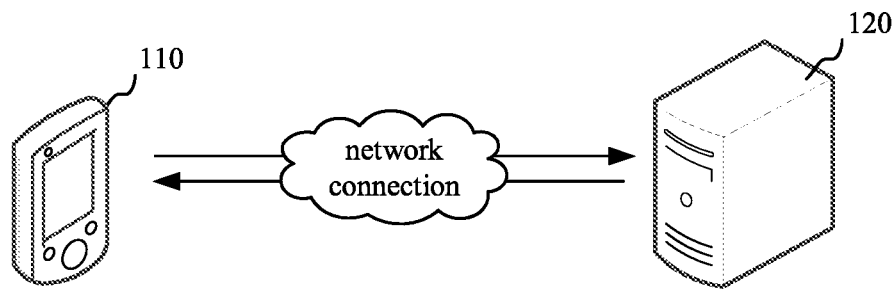
FIG. 1 is a schematic diagram illustrating an application environment of a method for obtaining content according to an embodiment.

For this, embodiments of the disclosure provide a method for obtaining content. The method for obtaining content provided by the disclosure may be applied in the application environment as illustrated in FIG. 1. The terminal 110 interacts with the server 120 via the network. The terminal 110 is installed with various applications, such as social applications and instant messaging applications. The terminal 110 includes a screen for human-machine interaction and for receiving operations on a page, so that the terminal may display the page and objects in the page based on the corresponding operation. For example, when the terminal receives a swiping-down operation through the screen, the terminal may move the page downwards based on the swiping-down operation. When the terminal receives a click operation on an object in the page through the screen, the terminal may display content of the clicked object based on the click operation. The objects include, but not limited to, videos, pictures and text published by the user. The server 120 stores content of respective objects of the page, and the terminal may obtain the content of respective objects from the server 120 and display it through the screen. In detail, the terminal obtains a swiping speed of a swiping in response to detecting an end of the swiping applied on the page, determines the object finally positioned by the swiping in the page based on the swiping speed and page parameters of the page, and obtains and displays the content of the object. The terminal 110 may be but not limited to a variety of personal computers, laptops, smart phones, tablets and portable wearable devices. The server 120 may be implemented as an independent server or a server cluster composed of multiple servers.

Figure 2:
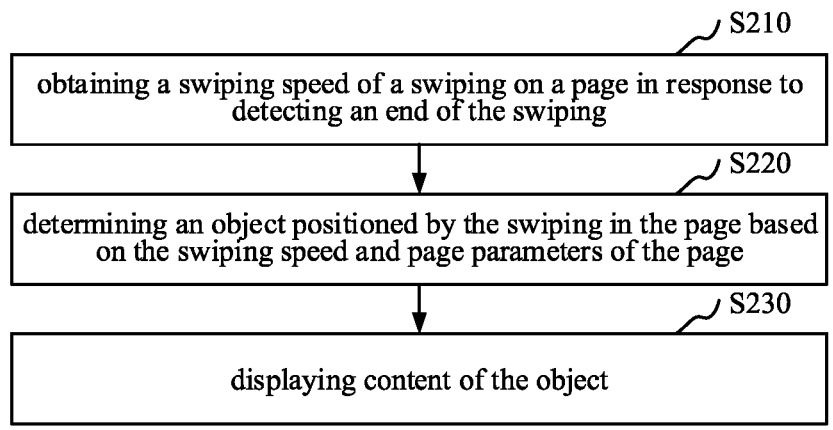
FIG. 2 is a flowchart of a method for obtaining content according to an embodiment.

FIG. 2 is a flowchart of a method for obtaining content according to an embodiment. As illustrated in FIG. 2, the method is applied in the terminal 110, and includes following actions.

At S210, in response to detecting an end of a swiping on a page, a swiping speed of the swiping is obtained.

The page is displayed on a screen of the terminal 110 and a user is operating on the page. The page may include at least one object currently displayed in the screen and several objects out of the screen obtained by a coarse-grained preloading. In detail, when the terminal receives the swiping through the screen, the terminal moves the page accordingly based on the direction of the swiping, to display the objects in the page, so that the user may continuously browse the objects in the page. The direction of the swiping is not limited to any of upwards, downwards, towards the left, and towards the right. When the terminal detects the end of the swiping applied on the page, the terminal obtains the swiping speed of the swiping. The swiping speed may be obtained by the terminal through performing swiping speed tracking in real time. That is, the terminal may obtain the swiping speed by tracking a series of events, for example, tracking the distance (for example, the number of pixels) which the swiping passes through in unit time (for example, in the time unit of 1 millisecond). The swiping speed may also be detected in real time by sensors installed in the terminal, which is not limited here.

At S220, an object positioned by the swiping in the page is determined based on the swiping speed and page parameters of the page.

At S230, content of the object positioned by the swiping is displayed.

The object positioned by the swiping refers to any object that can be displayed in the screen when the page stops moving. In embodiments, the object positioned by the swiping is the last object displayed in the screen along the swiping direction. For example, when the swiping is upward, and the page moves upwards therewith, then the object positioned by the swiping may refer to the object displayed at the lowest position of the screen when the page stops moving. The page parameters may refer to various parameters included in the page, for example, display parameters of the page, addresses of respective objects in the page, and screen positions of the respective objects. In detail, after obtaining the swiping speed of the swiping at the end of the swiping, the terminal determines the object displayed in the screen when the page stops moving, based on the swiping speed and the page parameters. Further, all the content of the object positioned by the swiping is loaded, such that the user may directly read all the content of the object positioned by the swiping when the page stops moving.

With the above method for obtaining content, in response to detecting the end of the swiping applied on the page, the object to be displayed in the screen when the page is static is positioned precisely based on the obtained swiping speed of the swiping and page parameters of the page. Detailed content of the object is obtained in advance, such that the user can directly browse the detailed content of the object when the page is static, without additional waiting, thereby improving the efficiency of obtaining content of the object. Moreover, by loading the detailed content of the object positioned by the swiping, instead of loading content of all the objects in the page, it is possible to avoid unnecessary resource waste.

Figure 3:
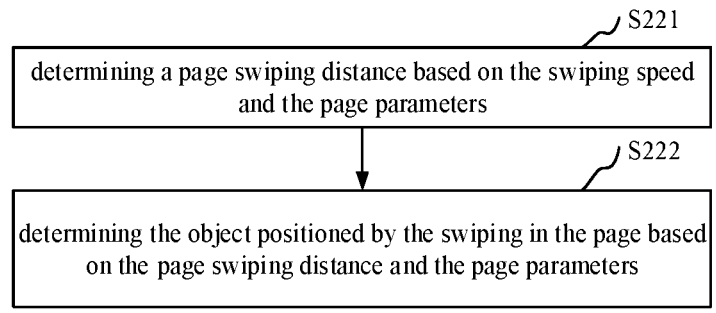
FIG. 3 is a flowchart of determining an object finally positioned according to an embodiment.

In an embodiment, as illustrated in FIG. 3, at S220, the object positioned by the swiping in the page may be determined based on the swiping speed and the page parameters of the page as follows.

At S221, a page swiping distance is determined based on the swiping speed and the page parameters.

At S222, the object positioned by the swiping in the page is determined based on the page swiping distance and the page parameters.

The page swiping distance may refer to the distance generated from triggering the swiping to stopping moving the page. Factors affecting the page swiping distance include but not limited to, the force, the swiping speed and the number of pressings of the swiping applied on the screen. There may be many ways to obtain the page swiping distance based on the above factors. For example, the page swiping distance may be determined based on the number of pressings within a specified area. In embodiments, in order to position the object in the page precisely, the terminal may determine the page swiping distance based on the swiping speed obtained at the end of the swiping and the page parameters of the page.

In detail, after the swiping is triggered, the page moves accordingly. The terminal may determine the distance of the page moving during the swiping based on the moving distance of the object of the page in the screen. Alternatively, the terminal may determine the distance of the page moving during the swiping based on monitored parameters such as the swiping speed and the swiping time. After the swiping ends, the page may continue to swipe a certain distance due to inertial motion. Therefore, in view of the principle of inertial motion, an inertial swiping distance after the end of the swiping may be determined based on the swiping speed or the inertial page wiping distance obtained from multiple experiments. Finally, the terminal obtains the page swiping distance based on the total moving distance, and thereafter, determines the object positioned by the swiping based on the page swiping distance and the page parameters.

In an embodiment, the page parameters include display parameters of a plurality of objects in the page. The display parameters are obtained at the first loading of the plurality of objects. At S222, determining the object positioned by the swiping in the page based on the page swiping distance and the page parameters of the page includes: determining page display sizes of respective objects based on the display parameters of respective objects; and determining the object positioned by the swiping in the page based on the page swiping distance and the page display sizes of the respective objects.

The display parameters refer to related parameters supporting configuring display effects of respective objects in the page. For example, the display parameters are not limited to size information of respective objects, such as aspect ratios; cover content; coordinate information and preset arrangement rules of respective objects in the page. For example, when the object is a picture, the cover content may be a thumbnail of the picture; when the object is a short video, the cover content may be a screenshot of the short video. The display parameters are obtained at first coarse-grained loading of respective objects in the page. Obtaining the display parameters at the first loading enables the respective objects in the page to be displayed in the screen, such that the user can browse the brief content of respective objects. In detail, after obtaining the display parameters of respective objects in the page through first loading, the respective objects in the page may be pre-arranged based on requirements and design layout of the product, to obtain page display sizes of respective objects. The display sizes include but not limited to display heights and display widths. The display sizes may be obtained based on the requirements and design layout of the product in conjunction with aspect ratios of respective objects, or may be preset fixed sizes. Taking a picture as an example, the cover of the picture may be set to have a fixed size. For example, when the picture is shot in a landscape mode, the display heigh of the cover is $H_1$, and when the picture is shot in a portrait mode, the display height of the cover is $H_2$. The display height may change with the actual size of the picture, which is not further described here.

After the display sizes of respective objects are obtained, the object positioned when the page stops moving may be positioned precisely based on the obtained page swiping distance and the display sizes of respective objects. In embodiments, by obtaining the display sizes of respective objects in the page and further precisely positioning the object requiring detailed content based on the display sizes and the page swiping distance, the accuracy of positioning the object may be improved.

Figure 4:
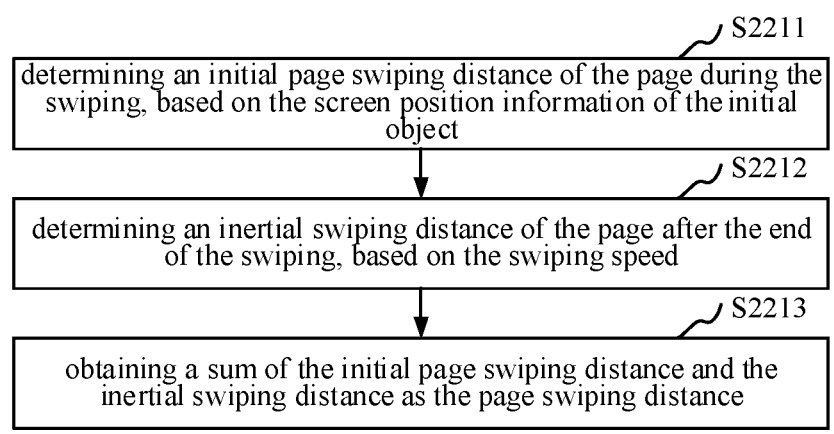
FIG. 4 is flowchart of determining a page swiping distance according to an embodiment.

In an embodiment, the page parameters include screen position information of an initial object of the swiping in the screen. The initial object is in the page. As illustrated in FIG. 4, at S221, determining the page swiping distance based on the swiping speed and the page parameters may include followings.

At S2211, an initial page swiping distance of the page during the swiping is determined based on the screen position information of the initial object.

The initial object of the swiping refers to the object where the swiping is initially located, i.e., the object where the swiping is located at the starting of the swiping. For example, the swiping is triggered by a finger of the user, and then the initial object of the swiping is the object where the finger is located. During the swiping, the terminal obtains the initial page swiping distance by monitoring change of position of the initial object in the screen.

At S2212, an inertial swiping distance of the page after the end of the swiping is determined based on the swiping speed.

At S2213, a sum of the initial page swiping distance and the inertial swiping distance is obtained as the page swiping distance.

The inertial swiping distance refers to that, after the swiping, due to the inertial motion, the page may continue to swipe a certain distance within a period of time, i.e., slow down to a static state. In detail, after detecting the end of the swiping, the terminal may determine the distance which the page still needs to move based on the detected swiping speed, and take this distance as the inertial swiping distance. The inertial swiping distance may be calculated based on the swiping speed, or may be determined through multiple experiments. For example, a correspondence between the swiping speeds and the inertial swiping distances is determined through multiple experiments, and after the swiping speed is obtained, the inertial swiping distance may be obtained from the correspondence. After the initial page swiping distance and the inertial swiping distance are obtained, the sum of the initial page swiping distance and the inertial swiping distance is taken as the page swiping distance. In embodiments, by including the distances generated in respective stages of the swiping of the page, the page swiping distance may be determined precisely, thereby improving the accuracy of positioning the object.

Figure 5:
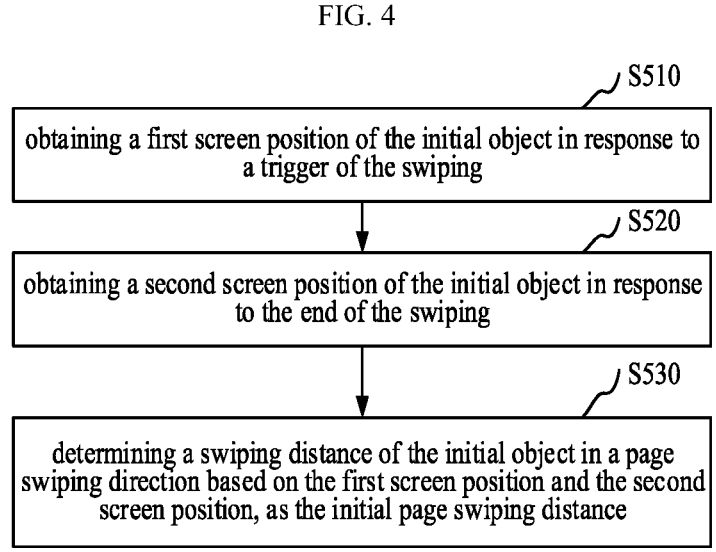
FIG. 5 is a flowchart of determining an initial page swiping distance according to an embodiment.

In an embodiment, as illustrated in FIG. 5, at S2211, the initial page swiping distance of the page during the swiping may be determined based on the screen position information of the initial object as follows.

At S510, a first screen position of the initial object is obtained in response to a trigger of the swiping.

At S520, a second screen position of the initial object is obtained in response to the end of the swiping.

At S530, a swiping distance of the initial object in the page swiping direction is obtained based on the first screen position and the second screen position, and taken as the initial page swiping distance.

The first screen position and the second screen position are not limited to the pixel position of the initial object in the screen. In detail, when the terminal detects that the swiping is triggered, the terminal obtains the position of the initial object in the screen as the first screen position. When the terminal detects that the swiping ends, the terminal obtains the position of the initial object in the screen as the second screen position. Further, the swiping distance of the initial object in the page swiping direction is calculated based on the first screen position and the second screen position, and taken as the initial page swiping distance. In this embodiment, by precisely positioning the position of the initial object in the screen, the accuracy is high and it is convenient to implement.

In an embodiment, determining the inertial swiping distance of the page after the end of the swiping based on the swiping speed includes: obtaining the inertial swiping distance of the page after the end of the swiping based on the swiping speed and a known inertia constant.

The inertia constant is configured in advance depending on actual requirements of the product. The speed of the inertial swiping of the page may be adjusted by adjusting the inertia constant. The inertia constant may be obtained by processing a plurality of historical inertia constants. In detail, after detecting that the swiping ends, the terminal obtains the swiping speed at the time of lifting the finger. The inertial swiping distance may be determined based on the following formula:

$$s = \frac{v^*2}{A}$$

where, s is the inertial swiping distance, v is the swiping speed, and A is the inertia constant.

In this embodiment, the inertial swiping distance is calculated based on the obtained swiping speed and the preset inertia constant, improving the accuracy. Moreover, the swiping speed of the page may be controlled by adjusting the inertia constant, thereby having a high flexibility.

Figure 6:
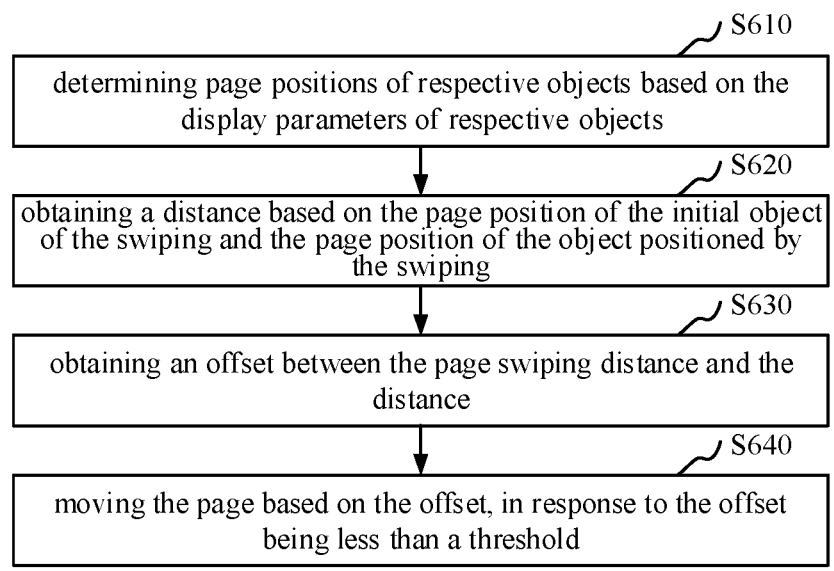
FIG. 6 is a flowchart of adjusting a page according to an embodiment.

In an embodiment, as illustrated in FIG. 6, the method further includes following actions.

At S610, page positions of respective objects are determined based on the display parameters of the respective objects.

At S620, a distance is obtained based on the page position of the initial object of the swiping and the page position of the object positioned by the swiping.

The page positions refer to positions of respective objects in the page. For example, the page positions may include page position coordinates in the page. The distance between the object where the swiping is initially located in the page and the object finally positioned by the swiping is a true distance. In detail, after obtaining the display parameters of respective objects, the page positions of respective objects may be determined based on the display parameters of respective objects. Then, the distance between the initial object and the object positioned by the swiping in the page is determined based on the page position of the initial object of the swiping and the page position of the object positioned by the swiping.

At S630, an offset between the page swiping distance and the true distance is obtained.

At S640, the page is moved based on the offset in response to the offset being less than a threshold.

It could be understood that, the object positioned by the swiping may be displayed partially or fully in the screen. In detail, after obtaining the distance between the initial object and the object positioned by the swiping in the page, the terminal calculates the difference between the page swiping distance and the true distance as the offset. The offset is compared with the threshold, to determine whether the object finally positioned when the page stops moving is fully displayed in the screen. If the offset is less than the threshold, it indicates that the object cannot be fully displayed in the screen when the page stops moving. Therefore, the page may be moved continuously in the swiping direction based on the offset, thereby enabling the object to be fully displayed in the screen. The threshold is not limited to 0.

In this embodiment, after determining the object positioned by the swiping, the page swiping distance is compared with the distance between the initial object and the object positioned by the swiping in the page, and the page is adjusted based on the comparing result, and thus the object positioned by the swiping can be displayed fully in the screen, without the need for the user to swipe and adjust the page again, improving the convenience.

Figure 7:
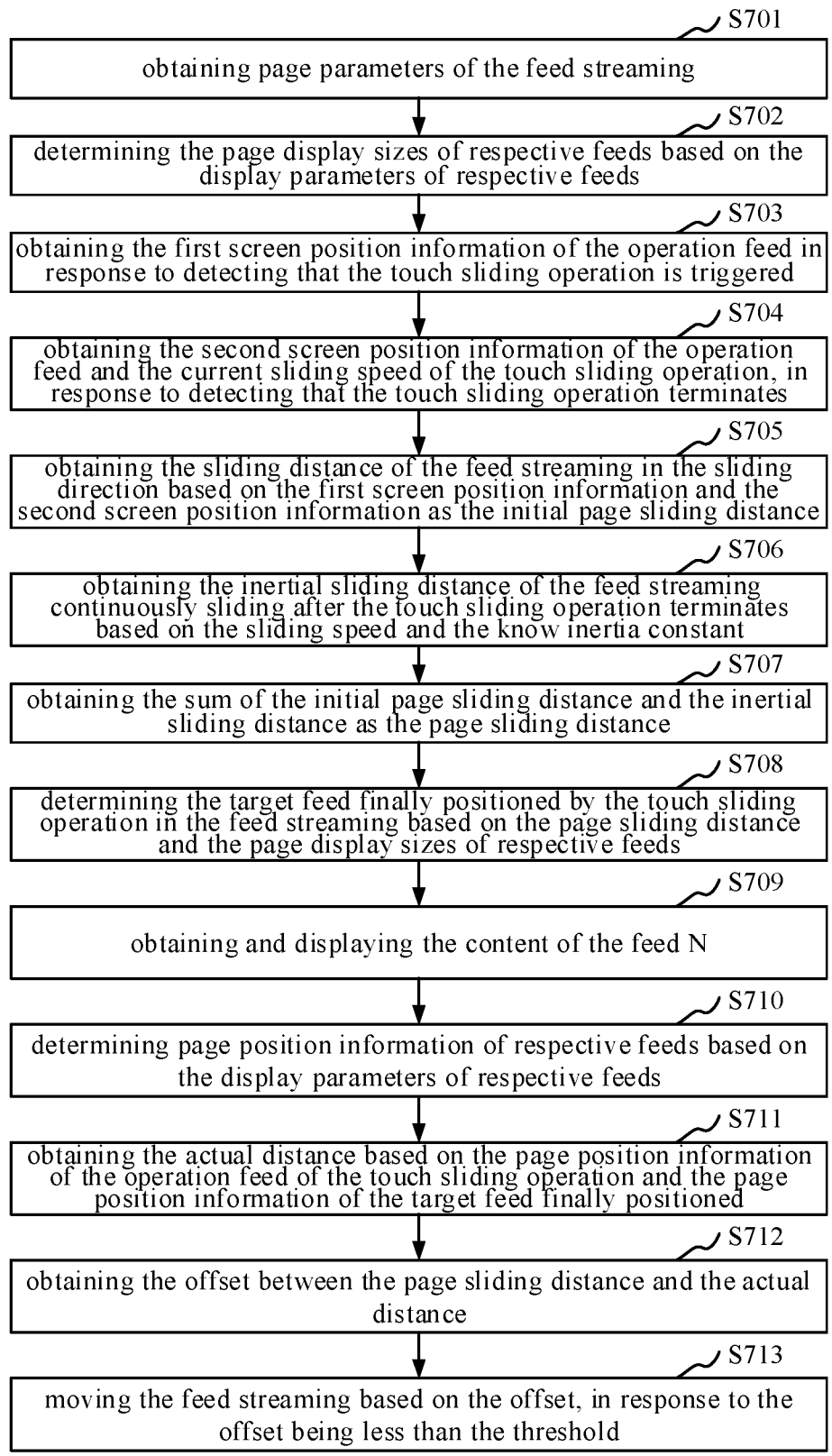
FIG. 7 is a flowchart of a method for loading content according to an embodiment.
Figure 8:
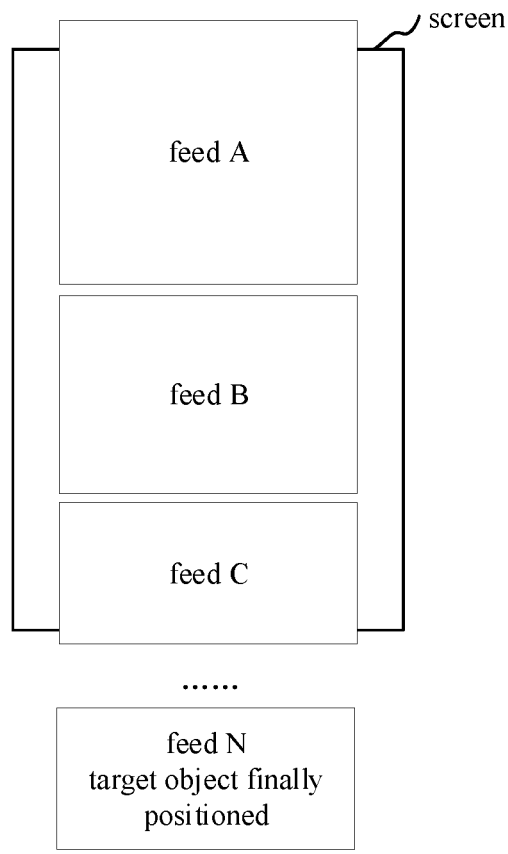
FIG. 8 is a schematic diagram of a page according to an embodiment.

FIG. 7 is a flowchart of a method for obtaining content according to an embodiment. In this embodiment, the terminal may display the page by using the technique of feed streaming. The feed streaming refers to that, several message sources actively subscribed by the user are combined together to form a content aggregator, which may help the user continuously obtain the latest content of the subscribed source. Each object (such as state or message) in the feed streaming is one flow. There are many display forms of the feed streaming. For example, the feeds are displayed to the user based on the chronological sequence of updates, or the order of displaying the feeds is determined by weights calculated based on some factors. For example, for short video applications, the feeds contained in the feed streaming may include short videos published by the user's follow account. When the user's follow account publishes new short videos, the short videos may be updated into the feed streaming based on the chronological sequence. When the user performs the swiping on the feed streaming, the user may continuously browse the feeds in the feed streaming. As illustrated in FIG. 8, feed A, feed B and feed C are objects currently displayed in the screen. When the terminal receives the swiping, the feed streaming is moved accordingly based on the swiping, and thus the feed before feed A or the feed after feed C may be displayed. In this embodiment, the feed streaming is moved upwards as an example. However, it could be understood that, regardless of the moving direction of the feed streaming, the target feed may be positioned when the feed streaming is static, with reference to the method in embodiments of the disclosure, and then the detailed content of the target feed may be obtained. As illustrated in FIG. 7, the following actions are included.

At 701, page parameters of the feed streaming are obtained.

The page parameters include but not limited to, the feed ID of each feed in the feed streaming, the display parameters of each feed, and the screen position information of each feed in the screen. The display parameters of each feed are obtained from first preloading, including but not limited to, the aspect ratio and the display content of the cover.

At 702, the page display sizes of respective feeds are determined based on the display parameters of respective feeds.

The display sizes include but not limited to, the heights and widths of respective feeds. In this embodiment, take moving the feed streaming upwards as an example, the display sizes may refer to the display heights. In detail, after obtaining the display parameters of respective feeds, the terminal pre-arranges the respective feeds in the feed streaming based on the requirements and design of the product, thereby knowing the display heights of respective feeds.

At 703, the first screen position information of the operation feed is obtained in response to detecting that the swiping is triggered.

The operation feed is the feed where the swiping is located when the swiping is performed. For example, the swiping is triggered by the finger of the user, and the operation feed of the swiping is the feed where the finger is located.

At 704, the second screen position information of the operation feed is obtained and the current swiping speed of the swiping is obtained, in response to detecting the end of the swiping.

The pixel distance which the swiping passes through in unit time may be taken as the swiping speed.

At 705, the swiping distance of the feed streaming in the swiping direction is obtained based on the first screen position information and the second screen position information, and taken as the initial page swiping distance.

At 706, the inertial swiping distance of the feed streaming continuously swiping after the end of the swiping is obtained based on the swiping speed and the know inertia constant.

The inertial swiping distance may be obtained based on the following formula:

$$s = \frac{v^{*}2}{A},$$

where, s is the inertial swiping distance, v is the swiping speed, and A is the inertia constant.

The inertia constant may be obtained by processing a plurality of historical inertia constants.

At 707, the sum of the initial page swiping distance and the inertial swiping distance is obtained as the page swiping distance.

At 708, the target feed finally positioned by the swiping in the feed streaming is determined based on the page swiping distance and the page display sizes of respective feeds.

In detail, referring to FIG. 8 again, the feed N will be displayed at the bottom of the screen when the feed streaming stops moving, and then the feed N is considered as the target feed finally positioned.

At 709, the content of the feed N is obtained and displayed.

That is, all the content of the feed N is obtained by loading and displayed in the screen when the feed streaming stops moving.

At 710, page position information of respective feeds is determined based on the display parameters of respective feeds.

At 711, the actual distance is obtained based on the page position information of the operation feed of the swiping and the page position information of the target feed finally positioned.

At 712, the offset between the page swiping distance and the actual distance is obtained.

The offset may be obtained based on the following formula:

offset=(initial page swiping distance+inertial swiping distance)−actual distance.

At 713, the feed streaming is moved based on the offset, in response to the offset being less than the threshold.

It should be understood that, although the steps in the flowchart in FIGS. 1-8 are shown in sequence as indicated by the arrows, they are not necessarily executed in the order indicated by the arrows. Unless explicitly stated in the disclosure, there is no strict order in which these steps can be executed, and these steps can be executed in any other order. Moreover, at least part of the steps in FIGS. 1-8 may include more sub steps or multiple stages, these sub steps or stages are not necessarily executed at the same time, but may also be executed at different times. These sub steps or stages are not necessarily executed in sequence, instead, they may be executed alternately with at least part of the other steps or sub steps or stages in other steps.

Figure 9:
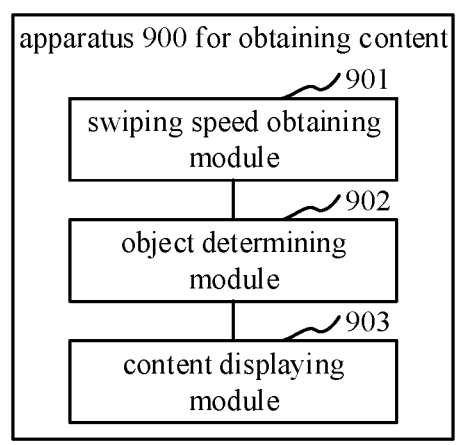
FIG. 9 is a block diagram of an apparatus for obtaining content according to an embodiment.

FIG. 9 is a block diagram of an apparatus 900 for obtaining content according to an embodiment. As illustrated in FIG. 9, the apparatus includes a swiping speed obtaining module 901, an object determining module 902 and a content displaying module 903.

The swiping speed obtaining module 901 is configured to obtain a swiping speed of a swiping on a page in response to detecting an end of the swiping.

The object determining module 902 is configured to determine an object positioned by the swiping in the page based on the swiping speed and page parameters of the page.

The content displaying module 903 is configured to obtain and display content of the object positioned by the swiping.

In an embodiment, the object determining module 902 includes a page swiping distance determining unit and an object determining unit.

The page swiping distance determining unit is configured to determine a page swiping distance based on the swiping speed and the page parameters.

The object determining unit is configured to determine the object positioned by the swiping in the page based on the page swiping distance and the page parameters.

In an embodiment, the page parameters include display parameters of a plurality of objects in the page, the display parameters are obtained at first loading of the plurality of objects, and the object determining unit is configured to: determine page display sizes of respective objects based on the display parameters of respective objects; and determine the object positioned by the swiping in the page based on the page swiping distance and the page display sizes of respective objects.

In an embodiment, the page parameters include screen position information of an initial object of the swiping in a screen, the initial object is in the page, and the page swiping distance determining unit includes an initial page swiping distance determining unit, an inertial swiping distance determining unit and a page swiping distance obtaining unit.

The initial page swiping distance determining unit is configured to determine an initial page swiping distance of the page during the swiping, based on the screen position information of the initial object.

The inertial swiping distance determining unit is configured to determine an inertial swiping distance of the page after the end of the swiping, based on the swiping speed.

The page swiping distance obtaining unit is configured to obtain a sum of the initial page swiping distance and the inertial swiping distance as the page swiping distance.

In an embodiment, the initial page swiping distance determining unit is configured to: obtain a first screen position of the initial object in response to a trigger of the swiping; obtain a second screen position of the initial object in response to the end of the swiping; and determine a swiping distance of the initial object in a page swiping direction based on the first screen position and the second screen position, as the initial page swiping distance.

In an embodiment, the inertial swiping distance determining unit is configured to determine the inertial swiping distance of the page after the end of the swiping, based on the swiping speed and a known inertia constant.

In an embodiment, the apparatus 900 further includes an inertial constant determining module.

The inertial constant determining module is configured to obtain a plurality of historical inertia constants and obtain the inertia constant by processing the plurality of historical inertia constants.

In an embodiment, the swiping speed obtaining module is configured to obtain a distance travelled by the swiping per unit time as the swiping speed.

In an embodiment, the apparatus 900 further includes a page position determining module, a distance obtaining module, an offset obtaining module and a moving module.

The page position determining module is configured to determine page positions of respective objects based on the display parameters of respective objects.

The distance obtaining module is configured to obtain a distance based on the page position of the initial object of the swiping and the page position of the object positioned by the swiping.

The offset obtaining module is configured to obtain an offset between the page swiping distance and the distance determined by the distance obtaining module.

The moving module is configured to move the page based on the offset, in response to the offset being less than a threshold.

Figure 10:
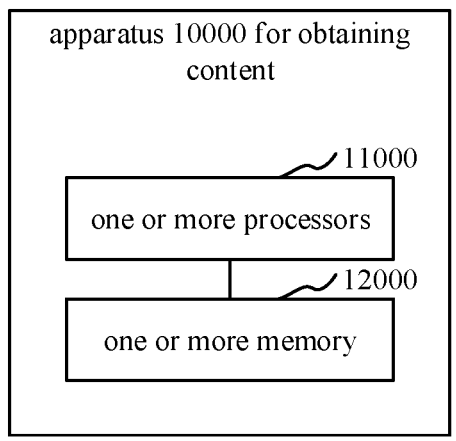
FIG. 10 is a block diagram of an apparatus for obtaining content according to another embodiment.

FIG. 10 is a block diagram of an apparatus for obtaining content according to another embodiment. As illustrated in FIG. 10, the apparatus 10000 includes one or more processors 110000 and one or more memory 12000.

The one or more memory 12000 is configured to store instructions executable by the one or more processors 11000.

The one or more processors 11000 are configured to executes the instructions, so as to: obtain a swiping speed of a swiping on a page in response to detecting an end of the swiping; determine an object positioned by the swiping in the page based on the swiping speed and page parameters of the page; and display content of the object.

In some embodiments, the one or more processors 11000 are configured to: determine a page swiping distance based on the swiping speed and the page parameters; and determine the object positioned by the swiping in the page based on the page swiping distance and the page parameters.

In some embodiments, the page parameters include display parameters of a plurality of objects in the page, the display parameters are obtained at first loading of the plurality of objects, and the one or more processors 11000 are configured to: determine page display sizes of respective objects based on the display parameters of respective objects; and determine the object positioned by the swiping in the page based on the page swiping distance and the page display sizes of respective objects.

In some embodiments, the page parameters include screen position information of an initial object of the swiping in a screen, the initial object is in the page, and the one or more processors 11000 are configured to: determine an initial page swiping distance of the page during the swiping, based on the screen position information of the initial object; determine an inertial swiping distance of the page after the end of the swiping, based on the swiping speed; and determine the page swiping distance as a sum of the initial page swiping distance and the inertial swiping distance.

In some embodiments, the one or more processors 11000 are configured to: obtain a first screen position of the initial object in response to a trigger of the swiping; obtain a second screen position of the initial object in response to the end of the swiping; and determine a swiping distance of the initial object in a page swiping direction based on the first screen position and the second screen position, as the initial page swiping distance.

In some embodiments, the one or more processors 11000 are configured to: determine the inertial swiping distance of the page after the end of the swiping, based on the swiping speed and a known inertia constant.

In some embodiments, the one or more processors 11000 are further configured to: obtain a plurality of historical inertia constants and obtain the inertia constant by processing the plurality of historical inertia constants.

In some embodiments, the one or more processors 11000 are configured to determine the swiping speed based on a distance travelled by the swiping per unit time.

In some embodiments, the one or more processors 11000 are further configured to: determine page positions of respective objects based on the display parameters of respective objects; obtain a distance based on the page position of an initial object of the swiping and the page position of the object positioned by the swiping; obtain an offset between the page swiping distance and the distance; and move the page based on the offset, in response to the offset being less than a threshold.

Regarding the apparatus in the foregoing embodiments, the specific manner in which each module performs the operation has been described in detail in the method embodiments, and detailed explanation will not be repeated here.

Figure 11:
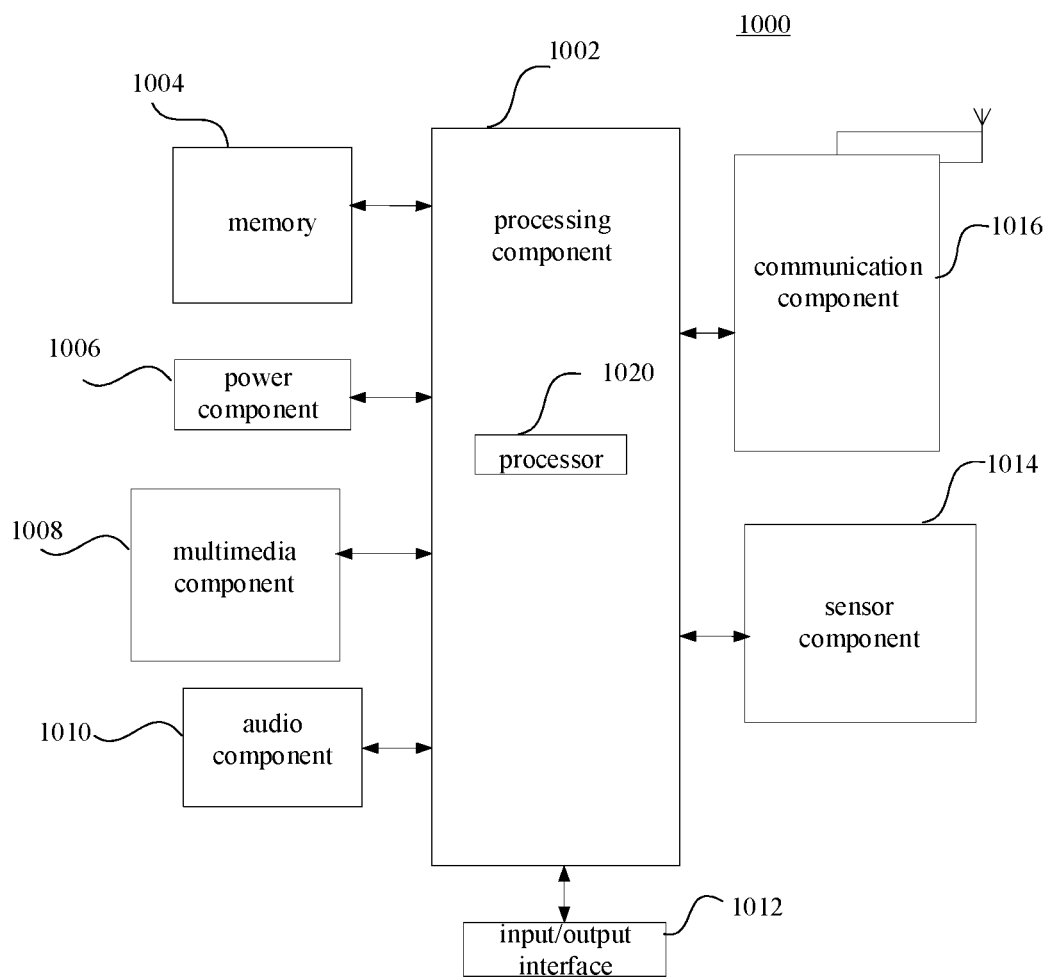
FIG. 11 is a block diagram of an electronic device according to an embodiment.

FIG. 11 is a block diagram of an electronic device 1000 according to an embodiment. For example, the electronic device 1000 may be a mobile phone, a computer, a digital broadcasting terminal, a messaging device, a game console, a tablet device, a medical device, a fitness device, a personal digital assistant, etc.

Referring to FIG. 11, the electronic device 1000 may include one or more of the following components: a processing component 1002, a memory 1004, a power component 1006, a multimedia component 1008, an audio component 1010, an input/output (I/O) interface 1012, a sensor component 1014 and a communication component 1016.

The processing component 1002 generally controls the overall operations of the electronic device 1000, such as the operations associated with display, telephone calls, data communications, camera operations, and recording operations. The processing component 1002 may include one or more processors 1020 to execute instructions to complete all or part of the steps of the aforementioned method. In addition, the processing component 1002 may include one or more modules to facilitate the interaction between the processing component 1002 and other components. For example, the processing component 1002 may include a multimedia module to facilitate the interaction between the multimedia component 1008 and the processing component 1002.

The memory 1004 is configured to store various types of data to support the operation of the electronic device 1000. Examples of these data include instructions for any application or method operating on the device 1000, contact data, phone book data, messages, pictures, videos, etc. The memory 1004 may be implemented by any type of volatile or non-volatile storage devices or their combination, such as a static random access memory (SRAM), an erasable Programmable read-only memory (EPROM), a programmable read-only memory (PROM), a read-only memory (ROM), a magnetic memory, a flash memory, a magnetic disk or an optical disk.

The power component 1006 provides power to various components of the electronic device 1000. The power component 1006 may include a power management system, one or more power supplies, and other components associated with generating, managing, and distributing power for the device 1000.

The multimedia component 1008 includes a screen that provides an output interface between the device 1000 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touching, swiping, and gestures on the touch panel. The touch sensor may not only sense the boundary of a touch or slide action, but also detect the duration and pressure related to the touch or slide operation. In some embodiments, the multimedia component 1008 includes a front camera and/or a rear camera. When the electronic device 1000 is in an operation mode, such as a shooting mode or a video mode, the front camera and/or the rear camera may receive external multimedia data. Each front camera and rear camera may be a fixed optical lens system or have focal length and optical zoom capabilities.

The audio component 1010 is configured to output and/or input audio signals. For example, the audio component 1010 includes a microphone (MIC). When the electronic device 1000 is in an operation mode, such as a call mode, a recording mode, and a voice recognition mode, the microphone is configured to receive external audio signals. The received audio signal may be further stored in the memory 1004 or transmitted via the communication component 1016. In some embodiments, the audio component 1010 further includes a speaker for outputting audio signals.

The I/O interface 1012 provides an interface between the processing component 1002 and a peripheral interface module. The peripheral interface module may be a keyboard, a click wheel, a button, and the like. These buttons may include but are not limited to: a home button, a volume button, a start button, and a lock button.

The sensor component 1014 includes one or more sensors for providing the electronic device 1000 with various aspects of status assessment. For example, the sensor component 1014 may detect the on/off status of the electronic device 1000 and the relative positioning of components.

For example, the component is a display and a keypad of the electronic device 1000. The sensor component 1014 may also detect the position change of the electronic device 1000 or a component thereof. The presence or absence of a contact between the user and the electronic device 1000, the orientation or acceleration/deceleration of the electronic device 1000, and temperature change of the electronic device 1000. The sensor component 1014 may include a proximity sensor configured to detect the presence of nearby objects when there is no physical contact. The sensor component 1014 may also include a light sensor, such as a CMOS or CCD image sensor, for use in imaging applications. In some embodiments, the sensor component 1014 may also include an acceleration sensor, a gyroscope sensor, a magnetic sensor, a pressure sensor or a temperature sensor.

The communication component 1016 is configured to facilitate wired or wireless communication between the electronic device 1000 and other devices. The electronic device 1000 may access a wireless network based on a communication standard, such as WiFi, 2G, or 3G, or a combination thereof. In an example embodiment, the communication component 1016 receives a broadcast signal or broadcast related information from an external broadcast management system via a broadcast channel. In an example embodiment, the communication component 1016 further includes a near field communication (NFC) module to facilitate short-range communication. For example, the NFC module may be implemented based on radio frequency identification (RFID) technology, infrared data association (IrDA) technology, ultra-wideband (UWB) technology, Bluetooth (BT) technology and other technologies.

In an embodiment, the electronic device 1000 may be implemented by one or more application specific integrated circuits (ASIC), digital signal processors (DSP), digital signal processing devices (DSPD), programmable logic devices (PLD), field programmable implemented by a gate array (FPGA), controllers, microcontrollers, microprocessors, or other electronic components, which are configured to implement the above voice control method.

In an embodiment, there is also provided a non-transitory computer-readable storage medium including instructions, such as the memory 1004 including instructions, which may be executed by the processor 1020 of the electronic device 1000 to complete the aforementioned method. For example, the non-transitory computer-readable storage medium may be a ROM, a random access memory (RAM), a CD-ROM, a magnetic tape, a floppy disk, an optical data storage device, etc.

Those skilled in the art would readily envisage other embodiments of the disclosure after considering the specification and practicing the disclosure. This application is intended to cover any variations, usages, or adaptive changes of the present disclosure, which follow the general principles of the present disclosure and include common knowledge or conventional technical means in the art which are not disclosed in the present disclosure. The description and the embodiments are considered as exemplary only, with a true scope and spirit of the present disclosure being indicated by the following claims.

It should be understood that the present disclosure is not limited to the precise structure that has been described above and illustrated in the drawings, and various modifications and changes may be made without departing from its scope. The scope of the present disclosure is limited only by the appended claims.

What is claimed is:

1. A method for obtaining content, comprising:
   displaying a page on a screen of a terminal;
   obtaining a swiping speed of a swiping on the page through the screen in response to detecting an end of the swiping;
   determining an object positioned by the swiping in the page based on the swiping speed and page parameters of the page,
   wherein said determining the object positioned by the swiping in the page based on the swiping speed and page parameters of the page comprises:
   determining a page swiping distance based on the swiping speed and the page parameters; and
   determining the object positioned by the swiping in the page based on the page swiping distance and the page parameters;
   determining page positions of respective objects based on display parameters of respective objects;
   obtaining an actual distance based on a first page position of an initial object of the swiping and a second page position of the object positioned by the end of the swiping, wherein the first and second page positions correspond to positions of respective objects in the page;
   obtaining an offset being a difference between the page swiping distance and the actual distance;
   moving the page based on the offset, in response to the offset being less than a threshold; and
   displaying full content of the object positioned by the offset when the page stops moving on the screen of the terminal by the end of swiping.

2. The method of claim 1, wherein the page parameters comprise display parameters of a plurality of objects in the page, the display parameters are obtained at first loading of the plurality of objects, and said determining the object positioned by the swiping in the page based on the page swiping distance and the page parameters comprises:
   determining page display sizes of respective objects based on the display parameters of respective objects; and
   determining the object positioned by the swiping in the page based on the page swiping distance and the page display sizes of respective objects.

3. The method of claim 1, wherein the page parameters comprise screen position information of an initial object of the swiping in the screen, the initial object is in the page, and said determining the page swiping distance based on the swiping speed and the page parameters comprises:
  determining an initial page swiping distance of the page during the swiping, based on the screen position information of the initial object;
determining an inertial swiping distance of the page after the end of the swiping, based on the swiping speed; and
  determining the page swiping distance as a sum of the initial page swiping distance and the inertial swiping distance.

4. The method of claim 3, wherein said determining the initial page swiping distance of the page during the swiping, based on the screen position information of the initial object comprises:
  obtaining a first screen position of the initial object in response to a trigger of the swiping;
  obtaining a second screen position of the initial object in response to the end of the swiping; and
  determining a swiping distance of the initial object in a page swiping direction based on the first screen position and the second screen position, as the initial page swiping distance.

5. The method of claim 3, wherein said determining the inertial swiping distance of the page after the end of the swiping, based on the swiping speed comprises:
  determining the inertial swiping distance of the page after the end of the swiping, based on the swiping speed and a known inertia constant.

6. The method of claim 5, wherein the inertial swiping distance is determined based on the following formula:

$$s = \frac{v*2}{A}$$

where, s is the inertial swiping distance, v is the swiping speed, and A is the inertia constant.

7. The method of claim 5, further comprising:
  obtaining a plurality of historical inertia constants and obtaining the inertia constant by processing the plurality of historical inertia constants.

8. The method of claim 1, wherein said obtaining the swiping speed of the swiping comprises:
  determining the swiping speed based on a distance travelled by the swiping per unit time.

9. An apparatus for obtaining content, comprising:
one or more processors; and
one or more memory, configured to store instructions executable by the one or more processors,
wherein the one or more processors are configured to execute the instructions, so as to:
display a page on a screen of a terminal;
obtain a swiping speed of a swiping on the page through the screen in response to detecting an end of the swiping;
determine an object positioned by the swiping in the page based on the swiping speed and page parameters of the page,
wherein the one or more processors are configured to:
determine a page swiping distance based on the swiping speed and the page parameters; and
determine the object positioned by the swiping in the page based on the page swiping distance and the page parameters;
determine page positions of respective objects based on display parameters of respective objects;
obtain an actual distance based on a first page position of an initial object of the swiping and a second page position of the object positioned by the end of the swiping, wherein the first and second page positions correspond to positions of respective objects in the page;
obtain an offset being a difference between the page swiping distance and the actual distance distance; and
move the page based on the offset, in response to the offset being less than a threshold; and
display full content of the object positioned by the offset when the page stops moving on the screen of the terminal by the end of swiping.

10. The apparatus of claim 9, wherein the page parameters comprise display parameters of a plurality of objects in the page, the display parameters are obtained at first loading of the plurality of objects, and the one or more processors are configured to:
  determine page display sizes of respective objects based on the display parameters of respective objects; and
  determine the object positioned by the swiping in the page based on the page swiping distance and the page display sizes of respective objects.

11. The apparatus of claim 9, wherein the page parameters comprise screen position information of an initial object of the swiping in the screen, the initial object is in the page, and the one or more processors are configured to:
  determine an initial page swiping distance of the page during the swiping, based on the screen position information of the initial object;
  determine an inertial swiping distance of the page after the end of the swiping, based on the swiping speed; and
  determine the page swiping distance as a sum of the initial page swiping distance and the inertial swiping distance.

12. The apparatus of claim 11, wherein the one or more processors are configured to:
  obtain a first screen position of the initial object in response to a trigger of the swiping;
  obtain a second screen position of the initial object in response to the end of the swiping; and
  determine a swiping distance of the initial object in a page swiping direction based on the first screen position and the second screen position, as the initial page swiping distance.

13. The apparatus of claim 11, wherein the one or more processors are configured to:
  determine the inertial swiping distance of the page after the end of the swiping, based on the swiping speed and a known inertia constant.

14. The apparatus of claim 13, wherein the one or more processors are further configured to:
  obtain a plurality of historical inertia constants and obtain the inertia constant by processing the plurality of historical inertia constants.

15. The apparatus of claim 9, wherein the one or more processors are configured to:
  determine the swiping speed based on a distance travelled by the swiping per unit time.

16. A non-transitory computer-readable storage medium, wherein when instructions in the storage medium are executed by a processor of an electronic device, the electronic device is caused to implement a method for obtaining content, the method comprising:
  displaying a page on a screen of a terminal;

obtaining a swiping speed of a swiping on the page through the screen in response to detecting an end of the swiping;

determining an object positioned by the swiping in the page based on the swiping speed and page parameters of the page, wherein said determining the object positioned by the swiping in the page based on the swiping speed and page parameters of the page comprises:

determining a page swiping distance based on the swiping speed and the page parameters; and determining the object positioned by the swiping in the page based on the page swiping distance and the page parameters;

determining page positions of respective objects based on display parameters of respective objects;

obtaining an actual distance based on a first page position of an initial object of the swiping and a second page position of the object positioned by the end of the swiping, wherein the first and second page positions correspond to positions of respective objects in the page;

obtaining an offset being a difference between the page swiping distance and the actual distance;

moving the page based on the offset, in response to the offset being less than a threshold; and displaying full content of the object positioned by the offset when the page stops moving on the screen of the terminal by the end of swiping.

\* \* \* \* \*